UNITED STATES PATENT OFFICE.

THOMAS C. MEADOWS, OF NEW YORK, N. Y., ASSIGNOR TO KAOLIN PRODUCTS CORPORATION, OF NEW YORK, N. Y., A CORPORATION OF VIRGINIA.

PROCESS OF PRODUCING FERTILIZER MATERIALS.

1,276,555.  Specification of Letters Patent.  Patented Aug. 20, 1918.

No Drawing.  Application filed December 8, 1916.  Serial No. 135,840.

*To all whom it may concern:*

Be it known that I, THOMAS C. MEADOWS, a citizen of the United States, residing at New York, in the county of New York and State of New York, have invented certain new and useful Improvements in Processes of Producing Fertilizer Materials; and I do hereby declare the following to be a full, clear, and exact description of the invention, such as will enable others skilled in the art to which it appertains to make and use the same.

This invention relates to a process of producing potassium phosphates from naturally occurring hydrous silicates containing potassium and has for its object to obtain said potassium phosphates in a manner more expeditious and less costly than has been heretofore proposed.

With this object in view the invention consists in the novel combinations of steps constituting the process all as will be more fully hereinafter disclosed and particularly pointed out in the claims.

In carrying out this process I prepare a suitable charge of a finely ground hydrous naturally occurring potassium bearing silicate such for example as glauconite, sericite, mica, etc. I prefer, however, to employ the well known naturally occurring "green sand" containing various percentages of glauconite and sometimes as much as 90% of that mineral. If "green sand" is employed I also prefer to calcine the same at a temperature sufficient to convert substantially all of its contained iron into the ferric condition although this is not essential in all cases. Whether this roasting process is or is not had, I prefer to grind the material to about 100 mesh fineness and to add to the finely divided material commercial acid phosphate, consisting principally of mono-calcium phosphate, but also containing say from 2% to 4% of di-calcium phosphate.

To illustrate the process I may take for example, a roasted mineral glauconite ground to approximately 100 mesh or finer. I add said acid phosphate to this mineral in the proportions indicated by the following equation.

This equation, however, does not state the entire or actual process, although it represents its general reaction, for owing to the small portion of di-calcium phosphate present, more or less di-potassium phosphate will be formed which does not appear in said equation. But the formation of this said di-potassium phosphate does not detract from the value of the process.

After the calcined finely ground green sand material has been suitably mixed with the said commercial acid phosphate, sufficient water is added to form a thin sludge or mud, and the mixture is treated in an autoclave, whereupon it is raised to a reacting temperature at atmospheric pressure, or for the purpose of accelerating the reaction it may be raised to a pressure above the atmosphere of say from 80 to 90 pounds.

After the digestion is completed the charge is filtered whereupon the crude filtrate containing the soluble potassium phosphates and other constituents is separated from the insoluble silicates, and the said filtrate can then be utilized for any suitable purpose.

The chief advantage of calcining the "green sand" is to cause the potassium content of the glauconite to be citrate soluble when recovered and therefore available as a plant food, and thereby increasing the commercial efficiency of the process.

Instead of digesting this said green sand with acid phosphate I find excellent results are attained by adding lime and digesting the same with the calcium hydrate thus formed, or calcium carbonate $CaCO_3$, may be added, as well as various other compounds of calcium adapted to form insoluble silicates.

It is obvious that those skilled in the art may vary the steps of the process without departing from the spirit of the invention, and therefore, it is not desired to be limited to the above disclosure except as may be required by the claims.

What is claimed is:—

1. The process of producing potassium phosphates from hydrous potassium bearing rocks which consists in finely dividing said rocks; mixing with the finely divided rock material a solution of a commercial acid calcium phosphate; and digesting the mixture until a crude potassium phosphate is formed, substantially as described.

2. The process of producing potassium phosphates from hydrous potassium bearing rocks which consists in calcining and finely dividing said rocks; mixing water with the finely divided rock material to form a sludge; adding to said sludge commerical acid phosphate containing mono-calcium phosphate and di-calcium phosphate; and digesting the mixture until mono-potassium phosphate and di-potassium phosphate are formed, substantially as described.

3. The process of producing potassium phosphates from glauconite which consists in finely dividing said glauconite; mixing water with the finely divided material to form a sludge; adding to said sludge commercial acid phosphate containing mono-calcium phosphate and a small proportion of di-calcium phosphate; and digesting the mixture at a pressure above three atmospheres until mono-potassium phosphate and di-potassium phosphate are formed, substantially as described.

4. The process of producing a crude potassium phosphate from "green sand" containing a substantial percentage of glauconite which consists in calcining said sand until substantially all the iron content of said glauconite appears in the ferric condition; finely dividing the calcined sand material; mixing sufficient water to said ground material to form a sludge; adding to said sludge commercial acid phosphate; and digesting the mixture until a crude potassium phosphate is formed, substantially as described.

In testimony whereof I affix my signature, in presence of two witnesses.

THOMAS C. MEADOWS.

Witnesses:
M. RICKETTS,
H. F. SAMPLE.